United States Patent Office 3,306,941
Patented Feb. 28, 1967

3,306,941
CYCLOALKENE PROCESS
Jared Abell, Pleasant Hill, Calif., assignor to Chevron Research Company, San Francisco, Calif., a corporation of Delaware
No Drawing. Filed July 16, 1965, Ser. No. 472,670
11 Claims. (Cl. 260—666)

Lower cycloalkene production is the subject of this disclosure. More particularly, this invention relates to a method of preparing lower cycloalkene hydrocarbons by heating to elevated temperatures certain cycloalkanesulfonate compounds.

Lower cycloalkenes are useful as intermediates in the chemical art, particularly for the production of dibasic aliphatic acids such as adipic and sebacic acid.

In a preferred mode of my process, ammonium cyclohexanesulfonate is heated under efficient heat exchange conditions and temperature control to a temperature above about 300° C. in the presence of aluminum oxide. As it is formed and volatilized, cyclohexene vapor is withdrawn from the heating zone and recovered.

The equation for the chemical transformation accomplished in this process appears to be as follows:

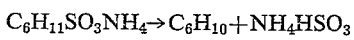

Certain other similar cycloalkane derivatives are useful feed compounds to my process. Compounds of the general formula

can be used to produce lower cycloalkenes where R may be a cycloalkane ring of from 5 to 12 carbon atoms, inclusive, and M is hydrogen, copper ion, or the conjugate acid of a sulfonate salt-forming basic nitrogen compound.

Preferred cycloalkanesulfonate feeds for the present process are the $C_5$, $C_6$, and $C_8$ ring compounds. The higher molecular weight species are more costly and are believed to be more prone to degradative thermal cracking effects than the above feeds.

Representative compounds are ammonium cyclopentanesulfonate, cyclohexanesulfonic acid, copper cyclooctane sulfonate, pyridine cyclododecanesulfonate and the like.

Cycloalkenes are produced by heating the above described feed compounds. Better results in general are obtained when the heating is accomplished in the presence of a refractory metal oxide, such as alumina, magnesia, silica and the like. Still better results are in general enjoyed when the heating is in the presence of the refractory oxide in the form of a fluidized bed. Heat control is, of course, better in a fluid bed. Localized overheating leads in general to charring and appreciable yield losses.

Because the copper sulfonate salts are useful feeds, it is advantageous to form this salt in situ in a catalytic manner as by using a fluidized copper oxide bed or copper oxide disposed on alumina or the like refractory oxides. In this event, the cycloalkane sulfonic acid is introduced into the bed, the salt appears to be momentarily formed, and the cycloalkene is produced.

For reasons of practicality, the ammonium cycloalkanesulfonate salts are preferred. Other basic nitrogen sulfonate salts can be used, and thus in the general formula above M may represent the conjugate hydrogen acid, i.e. $RNH_3^+$, of many lower amines such as methyl, dimethyl and trimethyl amine, as well as pyridine, quinoline, ethyl amine and the like; that is, by definition by lower monobasic nitrogen compounds is meant compounds in general containing less than about 10 carbon atoms, a single basic amino nitrogen atom and composed of carbon, hydrogen and nitrogen.

Most conveniently, this process is carried out under atmospheric pressure using an inert carrier gas such as nitrogen carbon dioxide and the like to sweep the generated cycloalkene vapor from the reactor. Subatmospheric pressures may also be employed and appear to facilitate in moderate measure rapid removal of the desired cycloalkene from the reaction zone. In general, the cycloalkene product should be withdrawn from the heating zone soon after formation, preferably within less than about ten seconds thereafter.

The following examples will serve to illustrate the invention, but they are not to be considered as limiting.

*Example 1*

Into a distilling flask with a distillation column and a receiver was charged ammonium cyclohexanesulfonate. The flask and its contents were heated slowly by means of a surrounding Woods metal bath to a final temperature of about 438° C. At about 300° C., evidence of product formation was first noted. The total time of heating was about 2.5 hours.

The product was collected and analyzed using vapor-phase chromtographic techniques and appropriate standards. Based upon salt used, the product and yield was found to be as follows:

| Product— | Mol percent yield |
|---|---|
| Cyclohexene | 36 |
| Benzene | 10 |
| Bottoms | ~54 |

*Example 2*

Ammonium cyclohexanesulfonate was mixed with finely divided alumina (Alundum) suitable for fluidizing in a fluid bed system. The salt and alumina were placed in a fluid bed apparatus, and the mixture was fluidized and heated by passing a stream of preheated nitrogen gas through it. An external heating means was also applied to the reactor. The off-gas stream was introduced into a Dry Ice coled receiver and the product collected.

The product was analyzed as in Example 1, and the results found were as follows:

| Product— | Mol percent yield |
|---|---|
| Cyclohexene | 76.0 |
| Benzene | 5.4 |
| Cyclohexane | 1.1 |
| Bottoms | ~17.5 |

*Example 3*

When barium cyclohexanesulfonate was substituted for the ammonium salt and the experiment carried out as in Example 1, no cyclohexene was produced, although the heating was carried up to 510° C. Much of the barium sulfonate salt was recovered unchanged.

*Example 4*

Copper cyclohexanesulfonate and alumina (Alundum) were mixed and heated as in Example 2, except that the temperature and pressure schedule differed. When the temperature reached about 290° C., the system pressure was reduced to about 0.3 atmosphere. The final temperature was about 330° C. The yield of cyclohexene recovered was 82 mole percent.

*Example 5*

In a reactor analogous to that of Example 1, 16.6 grams, .21 mol of copper oxide, were placed. The flask and contents were heated to 350° C., at which time via a dropping funnel cyclohexane sulfonic acid, 0.054 col, containing water, 8 grams, was slowly introduced into the flask and dropped upon the solid copper oxide. A stream of nitrogen gas was passed through the reactor vessel and passed into a Dry Ice cooled receiver wherein entrained cyclohexene was condensed and recovered. The temperature ranged from 350–450° C. during a period of about one hour. As previously discussed, the product was analyzed and the following result determined:

| Product— | Mol percent yield |
|---|---|
| Cyclohexene | 79 |
| Benzene | 18 |
| Bottoms | ~5 |

Under analogous conditions, cyclopentane-, cycloheptane-, cyclooctane- and higher cycloalkanesulfonates yield the corresponding cycloalkenes.

I claim:

1. Process for the production of $C_5$–$C_{12}$ cycloalkene hydrocarbons which comprises heating to a temperature in the range from about 250 to 500° C. a compound of the general formula $$RSO_3M$$

wherein R is a cycloalkane hydrocarbon radical having from 5 to 12 carbon atoms, inclusive and M is hydrogen, ammonuim, copper ion or a conjugate hydrogen acid of a lower mono-basic nitrogen compound composed of carbon, hydrogen and nitrogen.

2. Process of claim 1 wherein said compound is contacted during said heating with a refractory metal oxide.

3. Process of claim 1 wherein said compound is contacted during said heating with alumina.

4. Process of claim 3 wherein said compound is contacted with said oxide in a fluidized solid-bed reaction system.

5. The process of claim 1 wherein said compound is cycloalkanesulfonic acid.

6. The process of claim 1 wherein said compound is ammonium cycloalkanesulfonate.

7. Process for the production of cyclohexene which comprises heating to a temperature in the range from about 250 to 500° C. a compound of the general formula $$C_6H_{11}SO_3M$$

wherein M is hydrogen, ammonium, copper ion or a conjugate acid of a lower mono-basic nitrogen compound composed of carbon, hydrogen and nitrogen.

8. Process of claim 7 wherein said compound is contacted during said heating with a refractory metal oxide.

9. Process of claim 7 wherein said compound is contacted during said heating with alumina.

10. Process of claim 9 wherein said compound is contacted with said oxide in a fluidized solid-bed reaction system.

11. Process for the production of $C_5$–$C_{12}$ cycloalkene hydrocarbons which comprises heating to a temperature in the range from about 250° C. to 500° C. a fluidized solid bed of copper oxide and introducing into contact therewith a cycloalkanesulfonic acid of the general formula $$RSO_3H$$

wherein R is a cycloalkane hydrocarbon radical having from 5 to 12 carbon atoms, inclusive.

References Cited by the Examiner

UNITED STATES PATENTS 3,058,998 10/1962 Nace _____ 260—666
3,116,338 12/1963 Guest et al. _____ 260—666

DELBERT E. GANTZ, *Primary Examiner.*

V. O'KEEFE, *Assistant Examiner.*